Oct. 4, 1966    H. L. GARDNER    3,276,337
ROLLING DEVICE

Filed Jan. 28, 1964    3 Sheets-Sheet 1

INVENTOR
Harold L. Gardner
BY Alexander & Dowell
ATTORNEY

Oct. 4, 1966  H. L. GARDNER  3,276,337
ROLLING DEVICE

Filed Jan. 28, 1964  3 Sheets-Sheet 2

INVENTOR
Harold L. Gardner
BY Alexander & Dowell
ATTORNEY

Oct. 4, 1966 H. L. GARDNER 3,276,337
ROLLING DEVICE

Filed Jan. 28, 1964 3 Sheets-Sheet 3

INVENTOR
Harold L. Gardner

BY Alexander & Dowell
ATTORNEY

United States Patent Office 3,276,337
Patented Oct. 4, 1966

3,276,337
ROLLING DEVICE
Harold L. Gardner, 732 Alvarado, Redlands, Calif.
Filed Jan. 28, 1964, Ser. No. 340,769
9 Claims. (Cl. 94—50)

This invention relates to a novel roll for consolidating loose materials, and more particularly relates to a novel roll especially adapted to deliver pulsating compressive stresses to loose granular materials for the purpose of crushing and compacting such materials.

The present roll resembles the segmented rolls illustrated in Patents 2,754,734, 2,857,828, and 2,895,390 to A. W. Gardner, but functionally the present roll behaves in a somewhat different manner resembling in certain respects the action of a sheepsfoot roll. Actually, the behavior of the present roll is mid-way between the highly buoyant segmented roll illustrated in Patent 2,857,828 which, on the one hand, always rolls at or above the ultimate surface level to which it is capable of rolling the materials, and the behavior of the lugs on the non-buoyant sheepsfoot roll which, on the other hand, always punch through the ultimate surface level to which the roll is capable of compacting the loose materials.

Unlike the segmented rolls illustrated in the patents to A. W. Gardner listed above which show composite rolls forming a cylindrical surface part of which is cut away, the present pads do not lie upon the surface of a regular geometric figure such as a cylinder. The present pads are convex surfaces coming to an apex at their centers with these centers lying upon the surface of an imaginary cylinder, but all of the remaining areas of the pads lying inside of the imaginary cylinder.

Looking in a direction parallel with the axis of the roll on which the pads are mounted, the roll has a center which is also the center of the above-mentioned imaginary cylinder including the centers of all of the pads. Moreover, it is possible to imagine a series of smaller minor circles each of which coincides with the arcuate central portion of a pad. These latter imaginary circles are very much smaller in diameter than the said imaginary cylinder, approximately ⅙ its diameter in the working embodiment being tested at the time of filing this application.

In this particular working embodiment, the diameter of the roll (the major circle or cylinder) is 72 inches, and there are four adjacent rows of identical pads. The pads are a little less than one foot in length and about half as wide. The spacing between the pads of adjacent rows is about equal to the width of a pad and somewhat greater than the circumferential spacing between the pads in each row. The rows are staggered so that the center of a pad in one row lies midway between the pads in adjacent rows. The arcuate central portion of each pad corresponding with the surface of one of the smaller imaginary circles lies tangent to the major circle of the roll and therewithin. In the working embodiment these minor circles are 12 inches in diameter and the toe and heel portions of the pads lie in planes making a dihedral angle of 150° with respect to each other. The pads are all tilted about 6° forward of the radius lines passing through their apices.

The present roll performs differently on the first one or two passes through loose material than during subsequent passes over material which has been fairly well consolidated, or over relatively hard surfaces such as macadam. On fairly hard surfaces, substantially only the arcuate central portions of the pads come into contact with the material being compacted, and the roll leaves an imprint which is generally similar in shape to a tear-drop. The toe and heel portions of the pad scarcely contact the material at all in this type of service. On the other hand, when the roll is passing over loose materials, such as freshly filled earth, the pads sink more deeply into the soil and leave an imprint resulting from contact with the entire lower surface of the pad. As the materials become increasingly consolidated on subsequent passes, the area of pad contact with the materials shrinks both longitudinally and transversely of the pads, thereby increasing the unit area pressures on subsequent passes.

The present roll is incapable of rolling materials to a smooth-finish surface, and therefore it is not a finish roll. Referring to the Taylor pressure bulb theory discussed in detail in A. W. Gardner Patent 2,754,734, FIG. 5, the imprints left by the roll on each pass will be at the areas in which compactive stresses were actually applied by the roll, but according to the pressure bulb theory, these compactive forces spread beneath the surface of the material and tend to overlap each other so that the compactive coverage beneath the surface is more uniform than the distribution of stresses at the surface.

The pad shape described in connection with the working embodiment of the invention described above, is considered optimum, but certain modifications are well worth considering as economy measures achieved, however, at the expense of somewhat decreased performance. Unfortunately, the spherical pad shapes can be economically manufactured only by casting, pressing or forging techniques. On the other hand, a useful roll can be made using pads in which the central portions are not spherical, but merely cylindrical as viewed in the direction of the axis of the roll, and in which the toe and heel portions will be planar instead of cylindrical in cross-section taken transversely of the pad length. This is an easy shape to construct from sheet metal, and can be simplified even further by using a V-shaped pad comprising two planes meeting at a straight line which is tangent to the major circle of the roll, the two legs of the resulting chevron shape lying inside of this major circle. This latter case is arrived at by shrinking the diameter of the minor circle to a point, and this construction would be the most economical though perhaps the least efficient, especially from the point of view of pad wear at the apex of the chevron.

As stated above, although during early passes of the present roll through loose material, the pads sink in at least far enough to leave their entire imprints on the material, during subsequent passes when the material is more densely compacted the pads leave a progressively smaller imprint which automatically increases the unit-area stress applied to the material by each pad. As any particular pad leaves contact with the surface of the material, it cooperates with one or more adjacent pads (usually in other rows), which other pads approach contact with the surface of the material with a motion which is virtually straight down. The fact that the principal component of motion of the pad is straight downward when approaching the material is attributable to the forward tilt of the pad because of the fact that its line of symmetry is offset ahead of the center of the roll.

As the roll moves forward, the relatively abrupt arrivals of the pads on the surface of the material applying pulsating compactive forces to the material which closely resemble impact thereon, but as soon as the contact area of the pads shrinks from the maximum area of the pad, it becomes no longer possible for a pad to punch or shear through the surface level of the material because of the fact that the pad contact area would increase very rapidly if the pad should attempt to sink further into the material, assuming that the pad is leaving an imprint substantially smaller than its entire bottom surface area.

It is also very important to note that during the final compaction pass with the present roll, there is little or no destructive tendency which would tend to break through and/or shear the surface level to which the roll has processed the material. This fact is attributable to the arcuate contour of the central portion of the pad, and to the fact that the arc is coincident with the minor circle which is of smaller diameter than the diameter of the roll. In other words, once the imprint of the pad shrinks down to its central zone, the pad appears to the surface of the material to be a ball which rolls through a short distance in contact with the material and then suddenly lifts up and steps out of contact with the material without either shearing through the teardrop imprint which it leaves, or to any significant extent scuffing away the forward margin of the imprint to leave a mound of loose material. A similar effect is produced by a fully arcuate pad of similar longitudinal profile, and to a lesser degree by a chevron-shaped pad, although in the latter case a certain amount of shearing of the imprint takes place as the chevron rolls forward on its V-shaped apex before leaving contact with the material. Of these three types of pad, the spherical pad has an important advantage over the other two types, namely that upon subsequent passes over relatively hard-packed materials, the imprint of the pad not only shrinks longitudinally but also shrinks transversely so as to provide unit area stresses which increase rapidly because the zone of contact shrinks in two directions with increasing density of the material being rolled. In the case of the arcuate sheet metal pad or the chevron-shaped pad, all shrinkage of the contact area must occur along the longitudinal dimension of the imprint and cannot occur transversely of the imprint.

The present roll is not only particularly efficient in consolidating loose base-course materials but it has particular utility for use in salvaging materials by breaking them up into smaller, easily consolidated granular fill. In particular, the present roll is of special value in connection with the breaking up of shale and decomposed-granite types of materials which are found in western states. When the present roll encounters a slab of shale, since this is a substantially non-compressible material having a brittle planar surface, the roll applies all of its weight on a few very small zones of contact regardless of the attitude in which the pad contacts the hard surface, this type of contact resulting from the fact that the lowermost surface of the pad is spherical. This point-contact with extremely high pressures fractures brittle materials and comminutes them into sizes which can be efficiently compacted for base-course fill. Thus, the present roll, when breaking up hard and brittle materials, appears to be a series of point contacts due to the spherical lowermost shape of the pads, but when compacting dense and substantially homogeneous materials, the pads present a relatively much larger area of spherical shape which prevents them from shearing the material by punching through the imprint because of the fact that the area of contact does not substantially shrink while the spherical shape rolls through a few degrees on the material before suddenly stepping out of the material by moving substantially vertically away from it. The toe and heel portions do not participate extensively during the rolling of final passes over compacted materials, but do participate in the rolling of very loose materials to effectively increase the bottom contact areas of the pads sufficiently to prevent undue sinking thereof into the loose materials.

It is a common characteristic of all three of the pad modifications discussed herein that the arched pads touch the imaginary cylinder which is the locus of their outermost apices only at one point and all other points of the pad lie entirely within this cylinder. Thus, looking at a pad in profile, considering this point of contact and also a point at each circumferential end of the pad's compaction surface, these three points define a circle in a plane normal to the axis of the roll the diameter of which circle is smaller than the radius of the cylinder, and the circle is tangent to the inner surface.

It is the object of this invention to provide an improved roll structure which performs in the manner set forth in the general description above, and which has the advantages resulting from such performance.

Other objects and advantages of the invention will become apparent during the following discussion of the drawings, wherein.

Figure 1:
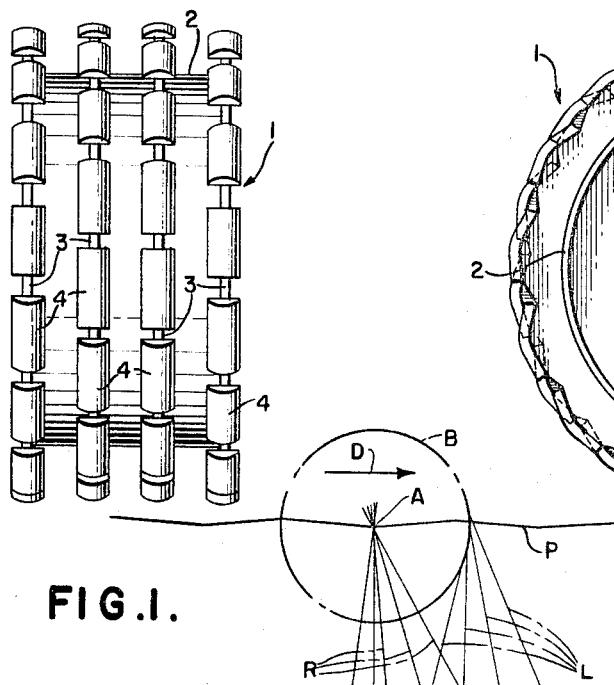
FIG. 1 is a front elevation view of a roll having four rows of pads shaped and arranged according to the present invention.
Figure 2:
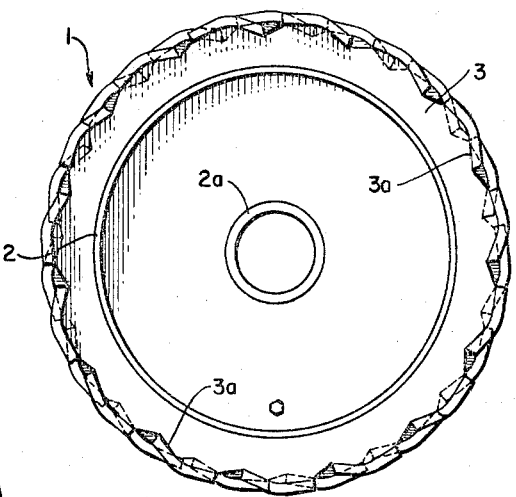
FIG. 2 is a side elevation view of the roll shown in FIG. 1.
Figure 3:
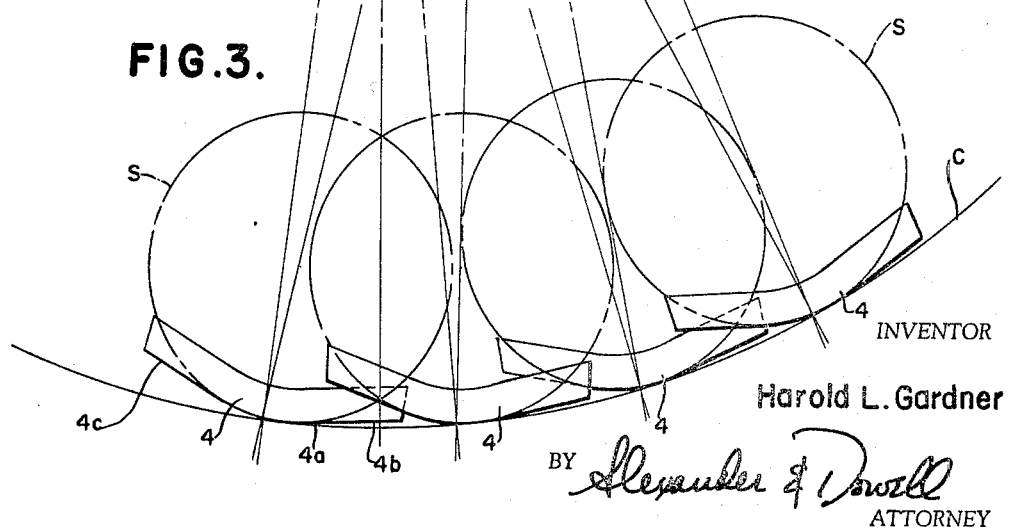
FIG. 3 is a diagrammatic figure serving to illustrate the construction geometry and the principles of the present invention.

Referring now to the drawings, FIGS. 1 and 2 show a roll 1 made in accordance with the present invention and including four adjacent rows of pads. The roll has a central drum portion 2 provided with a hub 2a in its center. The four rows of pads are supported on four annular rings 3 which can be welded to the outer surface of the drum 2, and which have especially shaped outer surfaces 3a shaped to receive the pads 4, the shapes of which will be described hereinafter in connection with FIGS. 13 through 16. In general, the pads 4 are arched, and each of the pads is tangent at one point on its compaction surface to an imaginary cylinder C as can be seen in FIG. 3, and in the preferred embodiment the pads have central spherical portions 4a which coincide with the surfaces of imaginary spheres S, FIG. 3. Each of the pads has a toe portion 4b and a heel portion 4c, these portions lying outside of the spheres S and blending into the central spherical pad zones. These portions, however, lie inside of the imaginary cylinder C which the apex of each pad 4 touches. The cylinder C has a center A from which a plurality of radii R are drawn in FIG. 3. The center A coincides with the center of the roll, and a wavy line P is shown which describes the motion of the center A of the roll if it were rolled on a very hard surface. Each of the pads 4 is symmetrical about its own line of symmetry L, four of these lines being shown in FIG. 3. These lines L do not pass through the center A of the roll but are tangent to a circle B having its center corresponding with the center A of the roll. These pads are thus tilted to lean in one direction such that as the center A of the roll progresses in the direction of the arrow D, each of the pads 4 is tipped in the forward direction.

The pads may or may not be tipped forward in various embodiments, but if they are tipped the angle will not be very great, usually lying in the range between 5 and 20 degrees.

Figure 4:
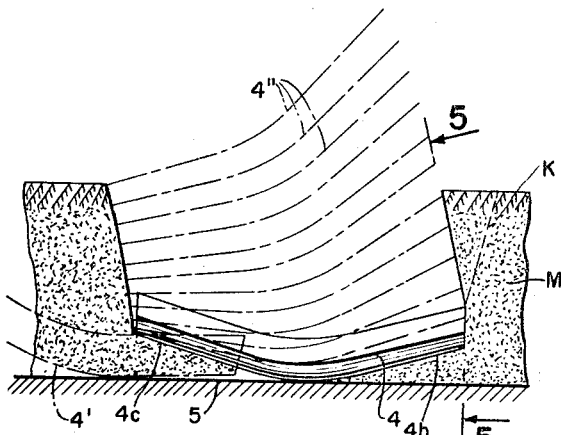
FIG. 4 is a simplified schematic diagram showing a family of curves made by a pad arched according to the present invention entering a loosely-packed lift of material.
Figure 5:
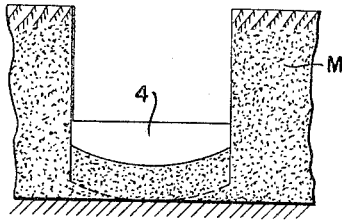
FIG. 5 is a view taken along line 5—5 of FIG. 4.
Figure 6:
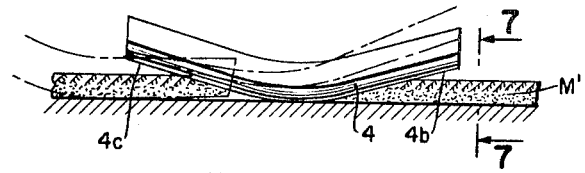
FIG. 6 is a schematic view similar to FIG. 4 and showing several positions of a pad entering a relatively thin lift of harder-packed material.

The action of the pads upon entering and leaving materials of various densities is shown in FIGS. 4 through 12 inclusive. In FIG. 4 a pad 4 is schematically shown in various stages of entering the loose material M, and also the position of the preceding pad 4' in an adjacent row is illustrated. The pad 4' has reached its maximum descent and is about to step up out of the material and lose contact therewith. The family of curves labeled 4" shows various positions of the pad 4 during entry. The level represented by the line 5 denotes an imaginary plane representing the lowest level to which the pads can sink in the material M with their present loading. FIG. 5 illustrates the front view of pad 4 in full contact with the material M into which it has sunk to a considerable depth. As the roll progresses further, the pad 4 will roll in such a direction as to raise its heel portion 4c and lower its toe portion 4b until the pad assumes a position corresponding with the position of the pad 4' shown in dashed lines in FIG. 4. It will then step out out of the material along a curve K shown in FIG. 4 and will fluff only a small amount of loose material onto the surface of the ground to be compacted during a subsequent pass.

FIGS. 6, 7, 8, and 9 shown the action of the pad 4 during later passes in which the material M' has been compacted to such a density that the pad does not sink deeply thereinto. The approach of the pad in FIG. 6 corresponds with its approach in FIG. 4 but the heel portion 4c of the pad no longer touches the ground at all. It can be seen from FIG. 7 that the spherical portion of the pad still contacts the ground over the full width of the pad, but this dimension will also shrink on the next pass over ground which is even more densely compacted. As the roll progresses from the entering position shown in FIG. 6 to the position of the pad shown in FIG. 8 in which the pad has completed its compaction and is on the verge of stepping out of the loose material, the pad has been rolled forward so that its toe portion 4b has pressed the material down beneath it, and the rear half of the pad is rocked clear of the ground. Thus, the shape of the imprint of the pad has changed from a contour of the entire pad as shown in FIG. 4 to a smaller imprint which will have a square front at the position F shown in FIG. 8, but will have an arcuate rear portion G indicating that less than the total area of the pad contacted the material.

Figure 10:
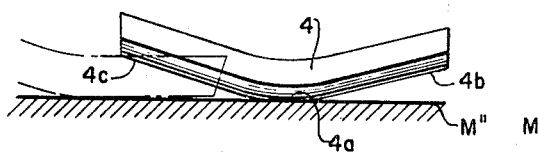
FIG. 10 is a schematic view showing the pad resting upon a substantially non-compressible surface at the moment of contact therewith.
Figure 11:
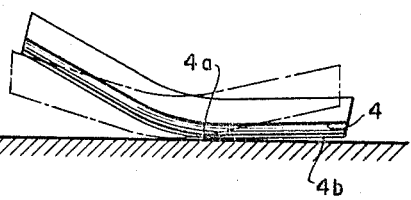
FIG. 11 is a view similar to FIG. 10 but showing the same pad about to leave contact with the hard surface.
Figure 12:
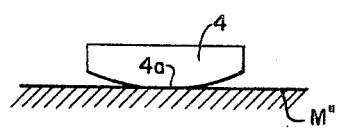
FIG. 12 is an end view of the pad shown in FIG. 10.

FIGS. 10 11 and 12 show that when the roll is rolled on a relatively hard surface, only the central zone of the pad touches the ground, this zone being spherical. Therefore, the imprint of the pad on a relatively hard material will be a small circle corresponding with the apex of the pad where it first touches the material as in FIG. 10, and then this small circle will be elongated in the direction of travel of the roll as the pad rocks forwardly to the position shown in FIG. 11, wherein, however, the pad is still resting entirely upon its spherical central zone. The toe and heel portions of the pad 4b and 4c do not touch the material M" being compacted, FIG. 11.

Figure 13:
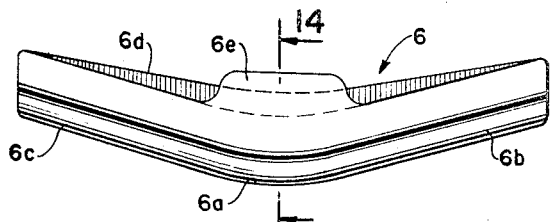
FIG. 13 is a side view of a production casting constituting a preferred embodiment of the pad according to the present invention.
Figure 14:
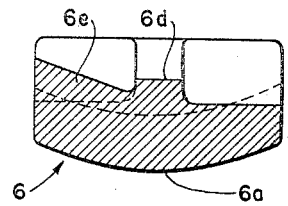
FIG. 14 is a section view taken along line 14—14 of FIG. 13.

FIGS. 13 and 14 show detail views of a pad casting 6 which casting includes a spherical central portion or zone 6a, a toe portion 6b, and a heel portion 6c. The pad is provided with a raised spine or web 6d at which the pad is welded to a supporting ring 3. The boss 6e of the pad is merely a casting expedient through which the metal is poured into the mold. The bottom central zone of this pad corresponds with the surface of an imaginary sphere S shown as a minor circle in FIG. 3, and the toe and heel portions 6b and 6c are tangent to that sphere as viewed from the side in FIG. 13, but are arcuate as viewed from the front in FIG. 14.

Figure 7:
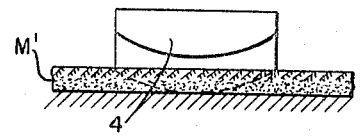
FIG. 7 is an end view of the showing in FIG. 6.
Figure 8:
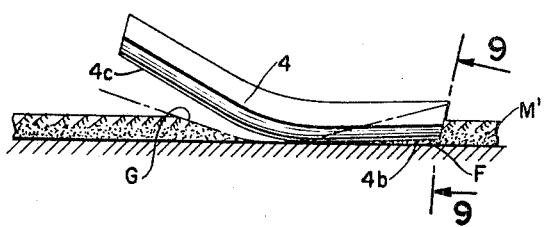
FIG. 8 is a schematic view similar to FIG. 6 but showing the same pad an instant later rolled into a position wherein it is about to leave contact with the material.
Figure 9:
FIG. 9 is a section view taken along line 9—9 of FIG. 8.
Figure 15:
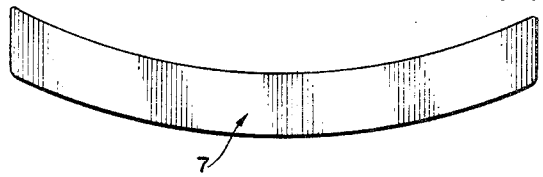
FIG. 15 is a side view of an arcuate pad having a lower surface which is substantially cylindrical.

FIG. 15 shows a modified pad 7 which is arcuate when viewed from the side as seen in FIG. 7 and can be made by bending sheet metal. The bottom of the pad when viewed normal to the plane of FIG. 15 is straight across, rather than arcuate, although an arcuate shape could be made by stamping the pads 7 out of sheet material. The fully arcuate shape shown in FIG. 15 is merely provided to show an easily made workable modification.

Figure 16:
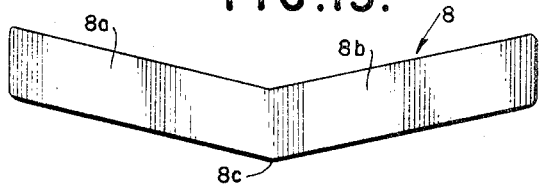
FIG. 16 is a side view of a chevron-shaped pad according to the present invention.

FIG. 16 shows still another easily fabricated modification in which the sheet metal is not bent, but is welded in two halves 8a and 8b to form a chevron-shaped pad. This pad can be used to provide performance approaching that of the pad shown in FIG. 13, but at the expense of much greater wear at the apex 8c of the pad. Moreover, the pad 8 would be considerably more destructive of the surface which it rolls because of the fact that it does not present a spherical bottom shape tending to avoid shearing, but instead, presents a V-shaped surface which causes a certain amount of shearing of the material being compacted.

Figure 17:
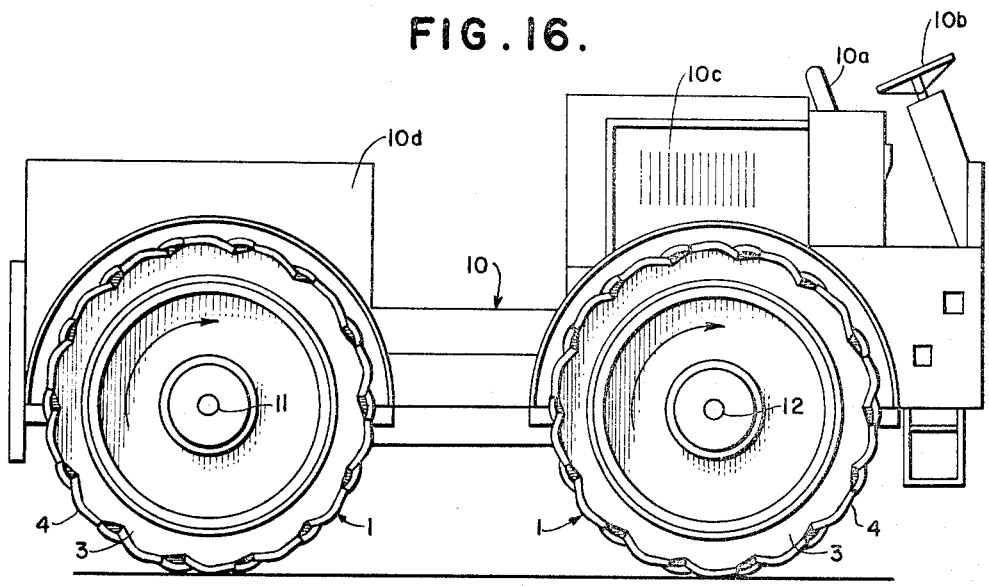
FIG. 17 is a side elevation of a multiple-axle vehicle equipped with wheels according to the present invention.

FIG. 17 shows a self-propelled vehicle 10 having multiple axles 11 and 12 each equipped with a roll 1 of the type shown in FIGS. 1 and 2. These pads have been tilted in such a direction that they will favor travel of the vehicle to the right in which direction each pad will tend to approach contact with the material with its line of symmetry L substantially vertical. The vehicle has a drivers seat 10a, steering wheel 10b, and a motor 10c, and includes suitable ballast tanks such as the tank 10d to permit loading of the rolls to the desired unit pressure.

This invention is not to be limited to the exact form shown in the drawings for obviously changes may be made therein within the scope of the following claims.

I claim:

1. A roll for compacting materials when rolled thereon, comprising annular supporting means having an axis of rotation; and a plurality of arched compaction pads mounted in mutually spaced relation on said supporting means each tangent at a point of contact with an imaginary cylinder concentric with the said axis, each pad having a compaction surface including a substantially spherical central zone forming an apex lying on a radius of the roll drawn from said axis to said point of contact the central zone of the pad being extended circumferentially of the roll by toe and heel portions of the pad which are cylindrical in cross-section and blend smoothly into the spherical zone, the toe and heel portions terminating well outside of an imaginary sphere coinciding with said spherical zone and well inside of said imaginary cylinder, the centers of all of the imaginary spheres being offset from said radii drawn to said points of contact, and the offsets being all in the same direction and equal in amount.

2. In a roll as set forth in claim 1, the pads being substantially identical and being about twice as long as they are wide, and said imaginary spheres having equal diameters lying in the range of one-quarter to one-half the radius of said imaginary cylinder.

3. In a roll as set forth in claim 2, the pads being mutually spaced apart by distances in the range of 1.0 to 0.50 the width of a pad as measured axially of the roll and the pads in adjacent rows being mutually staggered.

4. In a roll as set forth in claim 1, the diameter of each imaginary sphere being approximately one-third the radius drawn from said axis.

5. A roll for stressing materials being rolled, comprising a plurality of compaction pads supported on a hub for rotation about its axis and equidistant therefrom, the length of a pad as measured in the direction of the circumference of the roll being about twice its width as measured axially of the roll, and the pads being mutually spaced apart by distances not substantially exceeding the width of pad, each pad which is symmetrical about a plane of symmetry passing through the center of the pad and disposed parallel to and offset from said axis, the longitudinal ends of said surface and the center thereof including three points defining a circle of smaller diameter than the radius of the roll, all of the pads having their planes of symmetry offset in the same direction about the roll and the planes being staggered circumferentially out of transverse mutual alignment, and the angle between a line drawn from the center of the roll to the center of a pad, and the associated plane of symmetry being in the range of 5–20 degrees.

6. In a roll as set forth in claim 5, the diameter of each circle being about one-third the radius of the roll.

7. In a roll as set forth in claim 5, the compaction surface of each pad including a central zone comprising a portion of a sphere of which said circle is a great circle, and said center of the pad being at the center of said zone.

8. In a roll as set forth in claim 5, the compaction surface of each pad comprising a portion of a cylinder having an axis which passes through the center of said circle and which lies parallel with the axis of the roll.

9. In a roll as set forth in claim 5, the compaction surface of each pad being chevron-shaped when viewed in cross-section in a plane normal to said axis.

References Cited by the Examiner
UNITED STATES PATENTS

| | | | |
|---|---|---|---|
| 2,484,285 | 10/1949 | Greiner | 94—50 |
| 2,582,199 | 1/1952 | Gardner | 94—50 |
| 2,754,734 | 7/1956 | Gardner | 94—50 |
| 3,067,658 | 12/1962 | Palmiter | 94—50 |
| 3,071,050 | 1/1963 | Shatto | 94—50 |

JACOB L. NACKENOFF, *Primary Examiner.*